(12) United States Patent  
Kalhous et al.

(10) Patent No.: US 9,227,483 B2
(45) Date of Patent: Jan. 5, 2016

(54) VEHICLE CONNECTIVITY SYSTEMS, METHODS, AND APPLICATIONS

(75) Inventors: Amanda J. Kalhous, Ajax (CA);
Norman J. Weigert, Whitby (CA);
Jarvis Chau, Toronto, CA (US);
Michael J. Chappell, Oshawa (CA);
Gilles M. Delorme, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/035,343

(22) Filed: Feb. 25, 2011

(65) Prior Publication Data

US 2011/0224843 A1 Sep. 15, 2011

Related U.S. Application Data

(60) Provisional application No. 61/313,543, filed on Mar. 12, 2010.

(51) Int. Cl.
*G07C 5/00* (2006.01)
*F02N 11/00* (2006.01)
*B60H 1/00* (2006.01)
*F02N 11/08* (2006.01)
*H04L 29/08* (2006.01)

(52) U.S. Cl.
CPC ........ *B60H 1/00657* (2013.01); *B60H 1/00807* (2013.01); *F02N 11/0807* (2013.01); *H04L 67/12* (2013.01); *H04L 67/34* (2013.01); *F02N 2200/0806* (2013.01)

(58) Field of Classification Search
USPC .................................................. 701/2, 36, 48
See application file for complete search history.

(56) References Cited

U.S. PATENT DOCUMENTS

| 4,694,408 | A | | 9/1987 | Zaleski |
| 5,349,931 | A | * | 9/1994 | Gottlieb et al. ............ 123/179.2 |
| 5,461,908 | A | | 10/1995 | Armstrong |
| 6,076,026 | A | | 6/2000 | Jambhekar et al. |
| 6,147,418 | A | * | 11/2000 | Wilson ......................... 307/10.6 |
| 6,181,992 | B1 | | 1/2001 | Gurne et al. |
| 6,256,594 | B1 | | 7/2001 | Yamamoto et al. |
| 6,351,703 | B1 | * | 2/2002 | Avery, Jr. ...................... 701/112 |
| 6,370,454 | B1 | | 4/2002 | Moore |
| 6,701,233 | B2 | | 3/2004 | Namaky et al. |
| 6,732,032 | B1 | | 5/2004 | Banet et al. |

(Continued)

FOREIGN PATENT DOCUMENTS

CN 1455574 A 11/2003
CN 1468409 A 1/2004

(Continued)

OTHER PUBLICATIONS

Farsi, M., Ratcliff, K. & Barbosa, M. An overview of Controller Area Network. Computing & Control Engineering Journal. Jun. 1999. pp. 113-120.

(Continued)

*Primary Examiner* — Yonel Beaulieu
(74) *Attorney, Agent, or Firm* — Cantor Colburn LLP

(57) ABSTRACT

A method of remotely starting a vehicle using a remote device is provided. The method includes: receiving a first temperature associated with the vehicle; evaluating the first temperature at the remote device; and initiating the starting of the vehicle by generating a signal to the vehicle based on the start request and the first temperature.

18 Claims, 9 Drawing Sheets

(56) References Cited

U.S. PATENT DOCUMENTS

| | | | |
|---|---|---|---|
| 6,807,469 B2 | 10/2004 | Funkhouser et al. | |
| 6,925,368 B2 | 8/2005 | Funkhouser et al. | |
| 7,089,096 B2 | 8/2006 | Liebl et al. | |
| 7,164,924 B2 | 1/2007 | Ueda et al. | |
| 7,224,262 B2* | 5/2007 | Simon et al. | 340/426.13 |
| 7,228,211 B1 | 6/2007 | Lowrey et al. | |
| 7,317,974 B2 | 1/2008 | Luskin et al. | |
| 7,346,435 B2 | 3/2008 | Amendola et al. | |
| 7,487,112 B2 | 2/2009 | Barnes, Jr. | |
| 7,502,353 B2 | 3/2009 | Bolz | |
| 7,558,564 B2 | 7/2009 | Wesby | |
| 7,705,749 B2 | 4/2010 | Donaghey et al. | |
| 7,813,822 B1 | 10/2010 | Hoffberg | |
| 7,848,905 B2 | 12/2010 | Troxler et al. | |
| 7,868,753 B2 | 1/2011 | Jenkins et al. | |
| 7,940,173 B2 | 5/2011 | Koen | |
| 8,035,508 B2 | 10/2011 | Breed | |
| 8,106,757 B2 | 1/2012 | Brinton et al. | |
| 8,180,336 B2 | 5/2012 | Wesby | |
| 8,339,254 B2 | 12/2012 | Drew et al. | |
| 8,489,085 B2* | 7/2013 | Simmons | 455/420 |
| 8,547,340 B2 | 10/2013 | Sizelove et al. | |
| 8,838,088 B1* | 9/2014 | Henn et al. | 455/419 |
| 8,972,079 B2* | 3/2015 | Harumoto et al. | 701/2 |
| 2003/0046304 A1* | 3/2003 | Peskin et al. | 707/104.1 |
| 2003/0147534 A1 | 8/2003 | Ablay et al. | |
| 2003/0152088 A1 | 8/2003 | Kominami et al. | |
| 2003/0195680 A1 | 10/2003 | Pillar | |
| 2004/0111188 A1 | 6/2004 | McClure et al. | |
| 2004/0167689 A1 | 8/2004 | Bromley et al. | |
| 2004/0167690 A1 | 8/2004 | Yamada | |
| 2004/0203850 A1 | 10/2004 | Oesterling | |
| 2005/0004727 A1 | 1/2005 | Remboski et al. | |
| 2005/0085955 A1 | 4/2005 | Beckert et al. | |
| 2005/0097541 A1 | 5/2005 | Holland | |
| 2005/0131595 A1 | 6/2005 | Luskin et al. | |
| 2005/0251604 A1 | 11/2005 | Gerig | |
| 2006/0080007 A1* | 4/2006 | Gerard et al. | 701/2 |
| 2006/0122746 A1 | 6/2006 | Gawlik et al. | |
| 2006/0184295 A1 | 8/2006 | Hawkins et al. | |
| 2006/0200253 A1 | 9/2006 | Hoffberg et al. | |
| 2007/0069947 A1 | 3/2007 | Banet et al. | |
| 2007/0156311 A1 | 7/2007 | Elcock et al. | |
| 2007/0174356 A1 | 7/2007 | Horii et al. | |
| 2007/0244614 A1 | 10/2007 | Nathanson | |
| 2007/0271015 A1 | 11/2007 | Bauer et al. | |
| 2007/0294033 A1 | 12/2007 | Osentoski et al. | |
| 2008/0071428 A1 | 3/2008 | Kim | |
| 2008/0133067 A1 | 6/2008 | DeMay | |
| 2008/0167758 A1 | 7/2008 | Louch et al. | |
| 2008/0219274 A1 | 9/2008 | Kato et al. | |
| 2008/0258939 A1 | 10/2008 | Smith et al. | |
| 2008/0272906 A1 | 11/2008 | Breed | |
| 2008/0287074 A1 | 11/2008 | Grunhold | |
| 2009/0083805 A1 | 3/2009 | Sizelove et al. | |
| 2009/0096576 A1* | 4/2009 | Oman et al. | 340/5.62 |
| 2009/0112397 A1 | 4/2009 | Roberts et al. | |
| 2009/0312012 A1* | 12/2009 | Tieman et al. | 455/426.1 |
| 2009/0312899 A1 | 12/2009 | Mitchell et al. | |
| 2010/0030423 A1 | 2/2010 | Nathanson | |
| 2010/0037057 A1 | 2/2010 | Shim et al. | |
| 2010/0041397 A1 | 2/2010 | Chutorash et al. | |
| 2010/0072290 A1* | 3/2010 | Dage | 236/51 |
| 2010/0103859 A1 | 4/2010 | Isoyama | |
| 2010/0114403 A1 | 5/2010 | Isoyama | |
| 2010/0153969 A1 | 6/2010 | Dyba et al. | |
| 2010/0179721 A1 | 7/2010 | Willard et al. | |
| 2010/0198428 A1* | 8/2010 | Sultan et al. | 701/2 |
| 2010/0235046 A1* | 9/2010 | Proefke et al. | 701/36 |
| 2011/0029644 A1 | 2/2011 | Gelvin et al. | |
| 2011/0055292 A1 | 3/2011 | Madau et al. | |
| 2011/0071734 A1* | 3/2011 | Van Wiemeersch et al. | 701/49 |
| 2011/0086668 A1* | 4/2011 | Patel | 455/556.1 |
| 2011/0093135 A1 | 4/2011 | Moinzadeh et al. | |
| 2011/0153140 A1* | 6/2011 | Datta et al. | 701/29 |
| 2011/0224843 A1 | 9/2011 | Kalhous et al. | |
| 2011/0225260 A1 | 9/2011 | Kalhous et al. | |
| 2011/0225279 A1 | 9/2011 | Kalhous et al. | |
| 2011/0251751 A1 | 10/2011 | Knight | |
| 2011/0256904 A1* | 10/2011 | Simmons | 455/556.1 |
| 2011/0257817 A1* | 10/2011 | Tieman | 701/2 |
| 2012/0277950 A1 | 11/2012 | Plante et al. | |
| 2012/0290723 A1 | 11/2012 | Manikowski et al. | |
| 2014/0114499 A1* | 4/2014 | Perner | 701/2 |
| 2014/0121893 A1 | 5/2014 | Larschan et al. | |

FOREIGN PATENT DOCUMENTS

| | | |
|---|---|---|
| CN | 1622522 A | 6/2005 |
| CN | 1918544 A | 2/2007 |
| CN | 101064870 A | 10/2007 |
| CN | 101369153 A | 2/2009 |
| CN | 101426097 A | 5/2009 |
| CN | 101602370 A | 12/2009 |
| DE | 10237715 A1 | 2/2004 |
| WO | WO2010021426 A1 | 2/2010 |

OTHER PUBLICATIONS

German Office Action dated Aug. 23, 2012.

Kaiser, J. & Mock, M. Implementing the Real-Time Publisher/Subscriber Model on the Controller Area Network (CAN). ISORC '99 Proceedings of the 2nd IEEE International Symposium on Object-Oriented Real-Time Distributed Computing, pp. 172-181. IEEE Computer Society, May 1999.

German Office Action for Application No. 102011013406.9 dated Apr. 16, 2013; 7 pages.

Chinese Office Action for Application No. 201110108533.8 dated Mar. 21, 2013; 7 pages.

Chinese Office Action for Application No. 201110107942.6 dated May 6, 2013; 9 pages.

Chinese Office Action for Application No. 201110107942.6, dated Mar. 10, 2014; 7 pages.

Chinese Office Action for Application No. 201110107942.6, dated Dec. 9, 2013; 8 pages.

Chinese Office Action for applicaiton No. 201110107979.9, mailed Jan. 8, 2014, 5 pages.

* cited by examiner

VEHICLE CONNECTIVITY SYSTEMS, METHODS, AND APPLICATIONS

CROSS-REFERENCE

This patent application claims priority to U.S. Provisional Patent Application Ser. No. 61/313,543 filed Mar. 12, 2010 which is incorporated herein by reference in its entirety.

FIELD OF THE INVENTION

Exemplary embodiments of the present invention are related to systems and methods for communicating with a network of a vehicle.

BACKGROUND

A vehicle typically includes a plurality of controllers and devices. The controllers and devices communicate with each other using a vehicle on-board communication network. Such networks can include, for example, a vehicle bus that communicates according to a plurality of communication protocols such as a combination of a high speed controller area network (CAN) bus, and a low speed CAN bus. Accordingly, it is desirable to provide connectivity methods and systems to communicate with the on-board communication network.

SUMMARY OF THE INVENTION

Accordingly, in one embodiment, a method of remotely starting a vehicle using a remote device is provided. The method includes: receiving a first temperature associated with the vehicle; evaluating the first temperature at the remote device; and initiating the starting of the vehicle by generating a signal to the vehicle based on the start request and the first temperature.

The above features and advantages and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
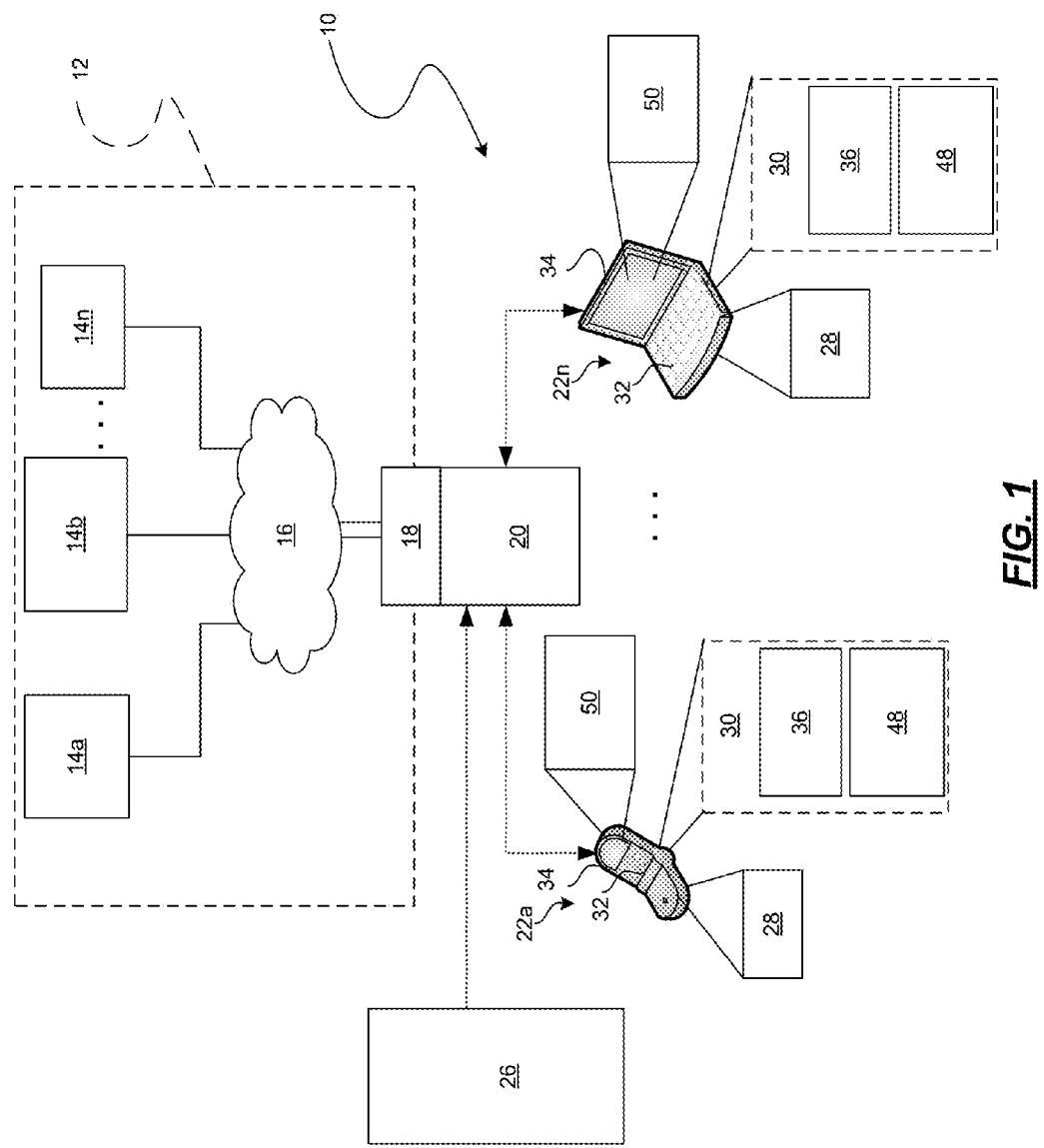
FIG. 1 is a functional block diagram of a communication system that includes a vehicle that communicates with various remote devices using a connectivity device in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, one or more software or firmware programs, a combinational logic circuit, and/or other suitable components that provide the described functionality.

In accordance with various embodiments of the invention a communication system of a vehicle 12 is shown generally at 10. The vehicle includes one or more control modules and/or devices 14a-14n that communicate via a vehicle network 16. The control modules and/or devices 14a-14n can include, for example, but are not limited to, an engine control module, a transmission control module, a body control module, a telematics (i.e. Onstar) module, or other electronic modules or devices resident within the vehicle 12. The vehicle network 16 can include any combination of wired or wireless communication channels. For example, the vehicle network 16 can include a single communication bus or a combination of various communication busses that are implemented according to vehicle communication network standards, such as, for example, Controller Area Network (CAN), Society of Automotive Engineers (SAE) J1850, and General Motors Local Areal Network (GMLAN).

The vehicle 12 further includes a communication port 18 (i.e. an assembly line diagnostic link (ALDL) port) that provides a data link to the vehicle network 16. A connectivity device 20 couples to the communication port 18. In various embodiments, the connectivity device 20 is a portable handheld device that removably couples to the communication port 18. In various other embodiments, the connectivity device 20 is integrated with the communication port 18 as a part of the vehicle 12.

The connectivity device 20 communicates data from the vehicle network 16 to various remote devices 22a-22n, such as, for example, cell phones, computers (i.e., servers, desktops, laptops, etc.), or various other electronic devices. The connectivity device 20 communicates the data according to one or more wireless communication protocols. In various embodiments, the connectivity device 20 receives data from a satellite system 26 and communicates the data to the remote devices 22a-22n and/or the vehicle network 16.

The remote devices 22a-22n can be configured to include, for example, a processor 28, a storage medium 30, one or more input and/or output (I/O) devices (or peripherals) 32, a display 34, and a network interface 36. The remote devices 22a-22n communicate with the portable connectivity device 20 via the network interface 36 and using a network protocol that is applicable to the remote device 22a-22n.

The remote devices 22a-22n can be configured to include one or more connectivity applications 48. A connectivity application 48 includes one or more software instructions that, when executed by the processor 28, download a corresponding device application to the connectivity device 20 to enable communication between the vehicle 12 and the remote device 22a via the connectivity device 20. In various embodiments, the connectivity application can be stored in the storage medium 30 of the remote device 22a, can be downloaded from a remote storage device (i.e. a central server) (not shown), and/or can be accessed from a remote location (i.e. a client-server application).

The connectivity application 48 further processes data communicated from the vehicle 12 in one form or another and performs one or more actions based on the processed data. In various embodiments, the connectivity application 48 presents the processed data via an application interface 50 through the display 34. In various embodiments, the connectivity application 48 communicates data or data requests back to the vehicle based on the processed data. Operations of the connectivity application 48 can be executed based on user input. User input to the connectivity application 48 can be received from the I/O devices 32 when the user interacts with the application interface 50.

Figure 2:
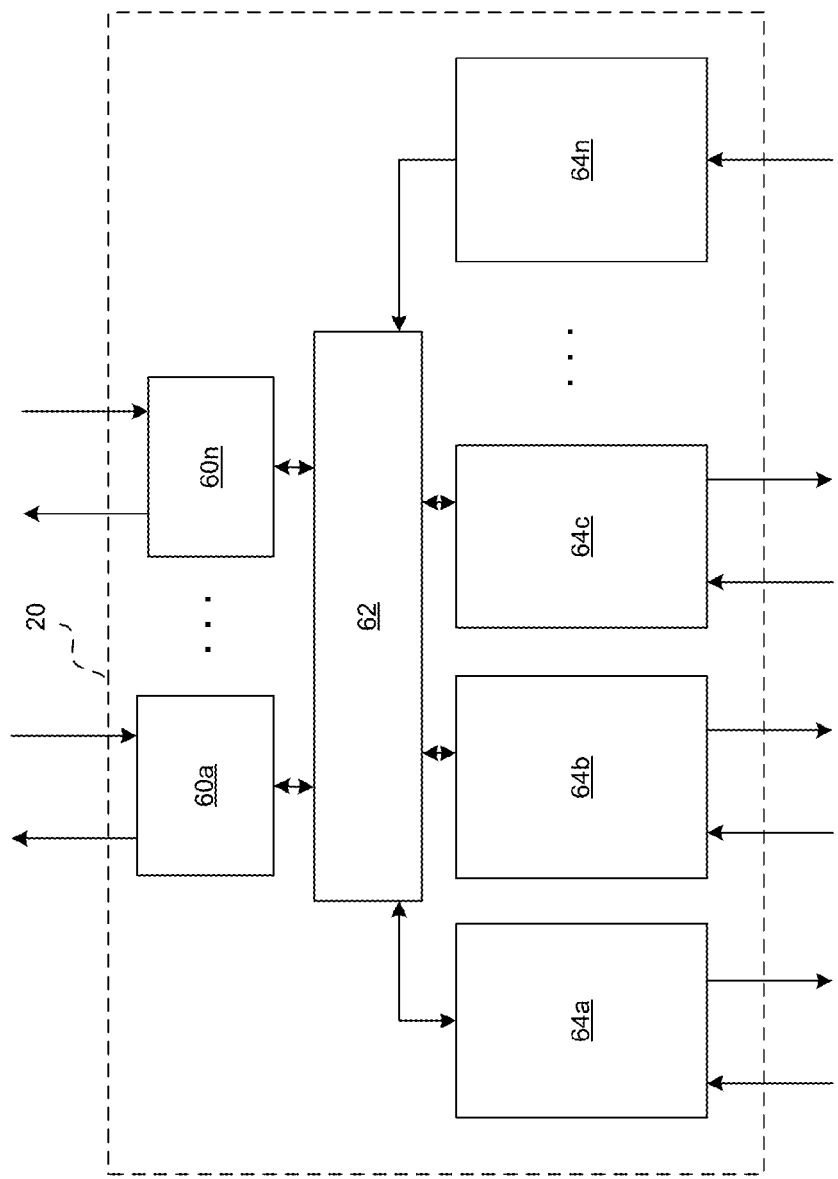
FIG. 2 is a functional block diagram of a connectivity device in accordance with an exemplary embodiment.

Referring now to FIG. 2, an exemplary connectivity device 20 is illustrated in accordance with various embodiments. The connectivity device 20 includes, for example, one or more network transceivers 60a-60n, a message manager module 62, and one or more wireless communication modules 64a-64n. The network transceivers 60a-60n correspond to the various communication channels of the vehicle 12. For example, network transceiver 1 can be a bidirectional high speed CAN transceiver, and network transceiver 2 can be a bidirectional low speed CAN transceiver, etc.

The one or more wireless communication modules 64a-64n corresponds to the network protocols supported by the various remote devices 22a-22n. The one or more wireless communication modules 64a-64n can include for example, but are not limited to, a telecommunications module 64a, a long range wireless module 64b, and a short range wireless module 64c. The telecommunications module 64a transmits data to and receives data from telecommunication remote devices (i.e., the cell phone) according to a telecommunications protocol (i.e., GSM, CDMA, 3G, HSPA+, 4G, LTE, etc.) The long range wireless module 64b transmits data to and receives data from the other long range remote devices, such as the computer, according to a long range wireless protocol (i.e., WiFi). The short range wireless module 64c transmits data to and receives data from close range remote devices, such as when the remote devices 22a-22n are within the vehicle 12, according to a short range protocol (i.e., BlueTooth).

In various embodiments, the wireless communications module 64a-64n further includes a satellite module 64n. The satellite module 64n receives data from the global positioning satellite system 26 according to a satellite communications protocol.

The message manager module 62 manages the communication of the data to and from the network transceivers 60a-60n, the data to and from the wireless communication modules 64a-64c, and data from the satellite module 64n. In various embodiments, the message manager module 62 manages the communications by making use of a dynamically configurable message list.

Figure 3:
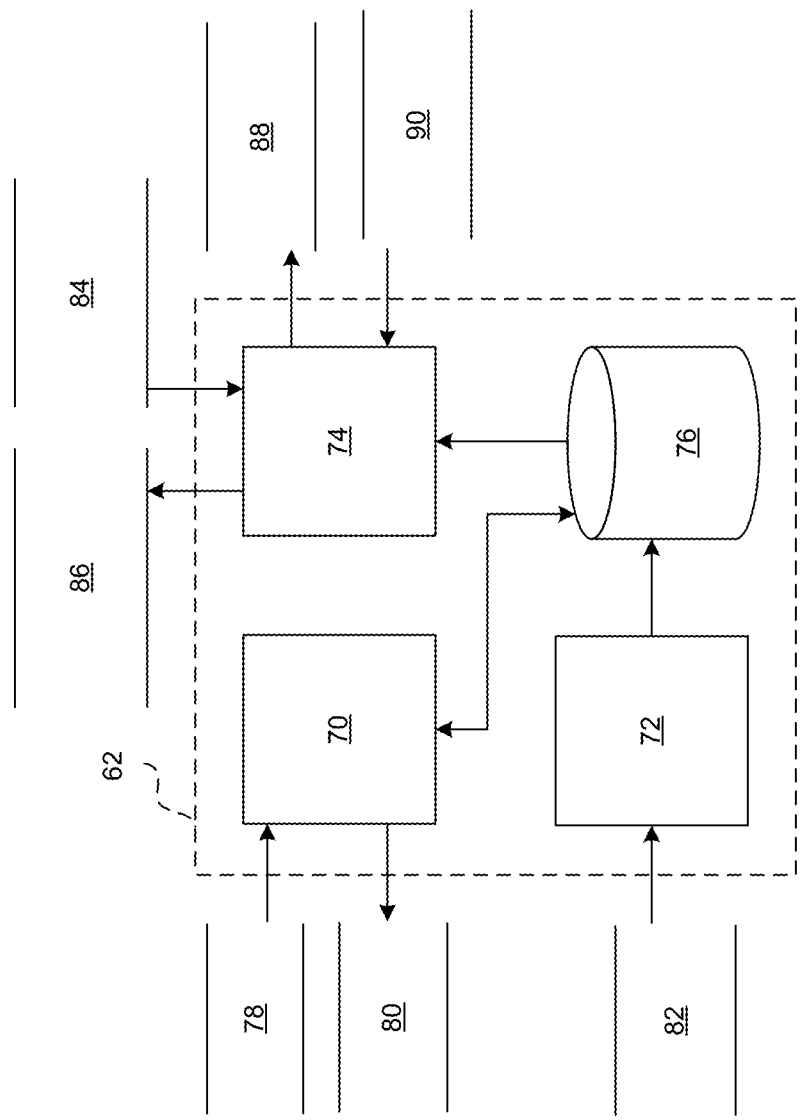
FIG. 3 is a dataflow diagram illustrating a message manager module of the connectivity device in accordance with an exemplary embodiment.

Referring now to FIG. 3, a dataflow diagram illustrates various embodiments of the message manager module 62 that may be embedded within the portable connectivity device 20 (FIG. 2). As can be appreciated, various embodiments of message manager modules 62 according to the present disclosure may include any number of sub-modules embedded within the message manager module 62. For example, the sub-modules shown in FIG. 3 may be combined and/or further partitioned to similarly manage the communications using the dynamically configurable message list. In various embodiments, the message manager module 62 includes a memory manager 70, an application download manager module 72, and an application execution manager 74. The managers interface with a device application storage medium 76. The device application storage medium 76 stores one or more device applications.

Figure 4:
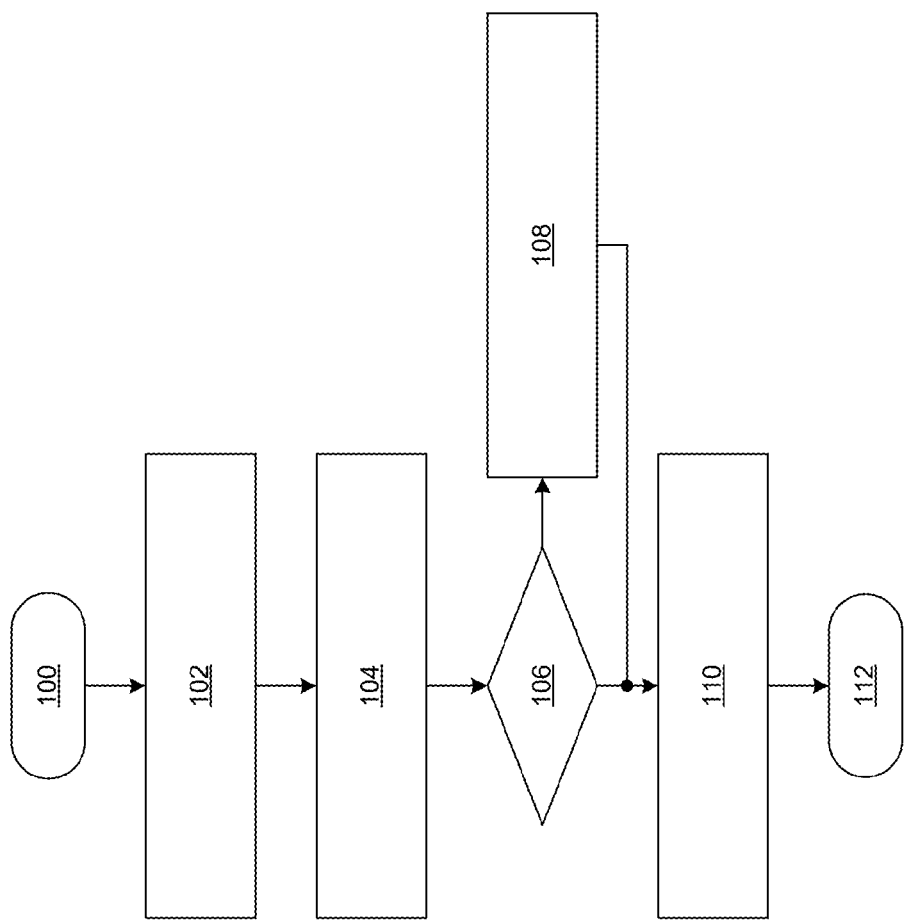
FIGS. 4 and 5 are flowcharts illustrating message manager methods that can be performed by the message manager module in accordance with exemplary embodiments.

In various embodiments, the memory manager 70 manages the data content stored in the device application storage medium 76. For example, with reference to FIGS. 3 and 4, when a new connectivity application 48 (FIG. 1) has been downloaded to a remote device 22a (FIG. 1) and the connectivity application 48 (FIG. 1) communicates a new application request 78 to the connectivity device 20 (FIG. 2) at 102, the memory manager 70 (FIG. 3) determines whether sufficient memory is available to store the device application associated with the connectivity application 48 (FIG. 1) at 104. If sufficient memory is available at 106, the memory manager 70 generates a download request 80 to the connectivity application 48 (FIG. 1) of the remote device 22a (FIG. 1) at 110. If, however, there is not sufficient memory at 106, the memory manager selectively removes other device applications based on one or memory management methods (i.e., first in first out, last in first out, remove least used, etc.) at 108 and generates the download request 80 to the connectivity application 48 (FIG. 1) of the remote device 22a (FIG. 1) at 110.

With reference to FIG. 3, the device application download manager module 72 receives the device application 82 from the remote device 22a (FIG. 1) and manages the storage of the device application 82 in the device application storage medium 76. The application execution manager 74 then manages the execution of the device application 82 based on one or more communications from the connectivity application 48 (FIG. 1) of the remote device 22a (FIG. 1) and further based on one or more communications from the vehicle network 16 (FIG. 1).

Figure 5:
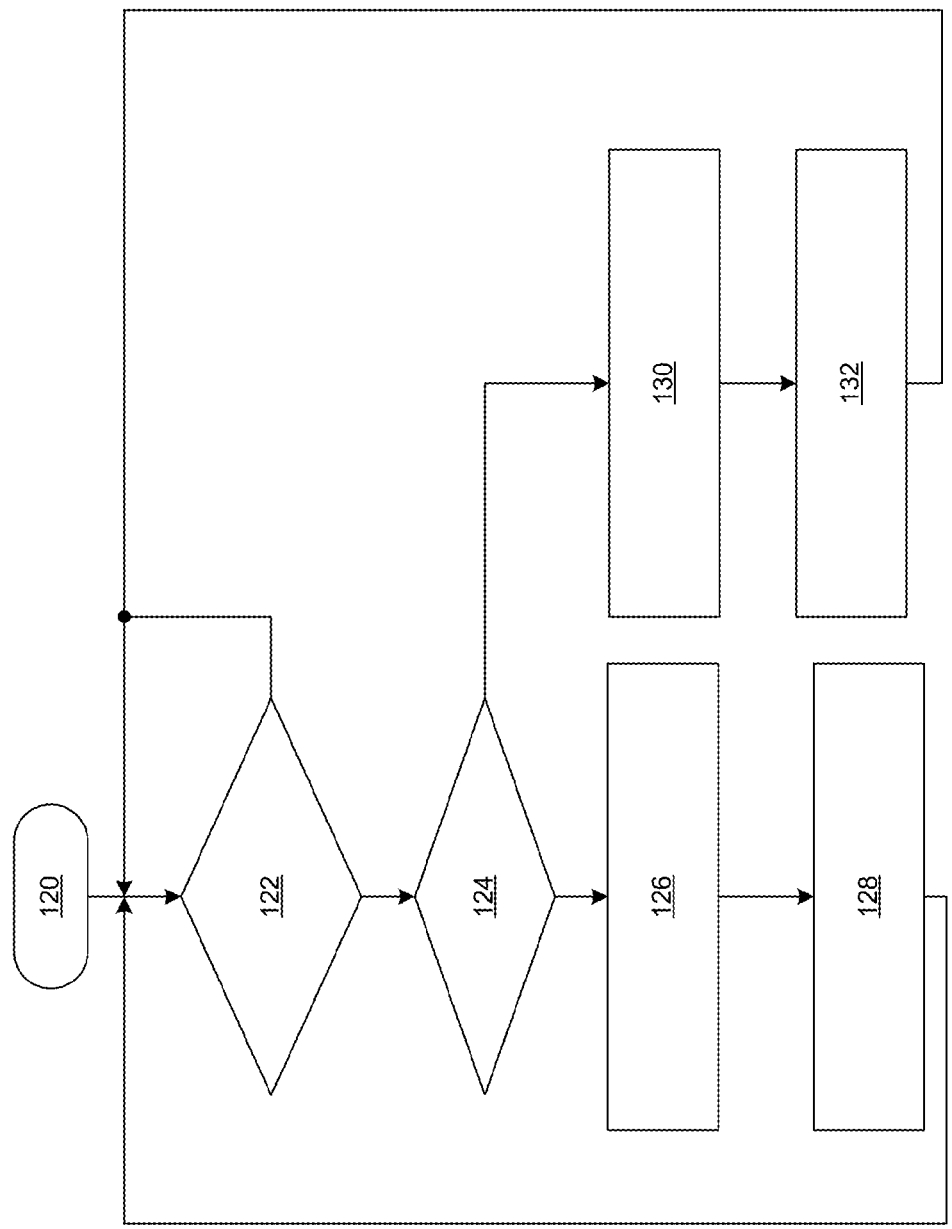

A device application 82, as shown in FIG. 5, for example, receives communications 84 from the remote device 22a (FIG. 1) through one of the wireless communication modules 64a-64n at 122. The device application 82 then manages the communications 84 based on whether the communication is a request for data from the vehicle 12 (FIG. 1) or data to be transmitted to the vehicle 12 (FIG. 1). For example, when the communication 84 includes data to be transmitted to the vehicle 12 (FIG. 1) at 124, the device application 82 assembles the data into a configurable message of the configurable message list of the vehicle network 16 at 130. The device application 82 then makes the message available for transmittal by the network transceivers 60a-60n via outgoing communications 88 at 132. Likewise, when the communication 84 includes a request for data at 124, the device application 82 monitors the vehicle network 16 for the message that includes the data via incoming communications 90 at 126 and routes the data to the appropriate wireless communication module 64a-64n (FIG. 2) via outgoing communications 86 at 128.

Figure 6:
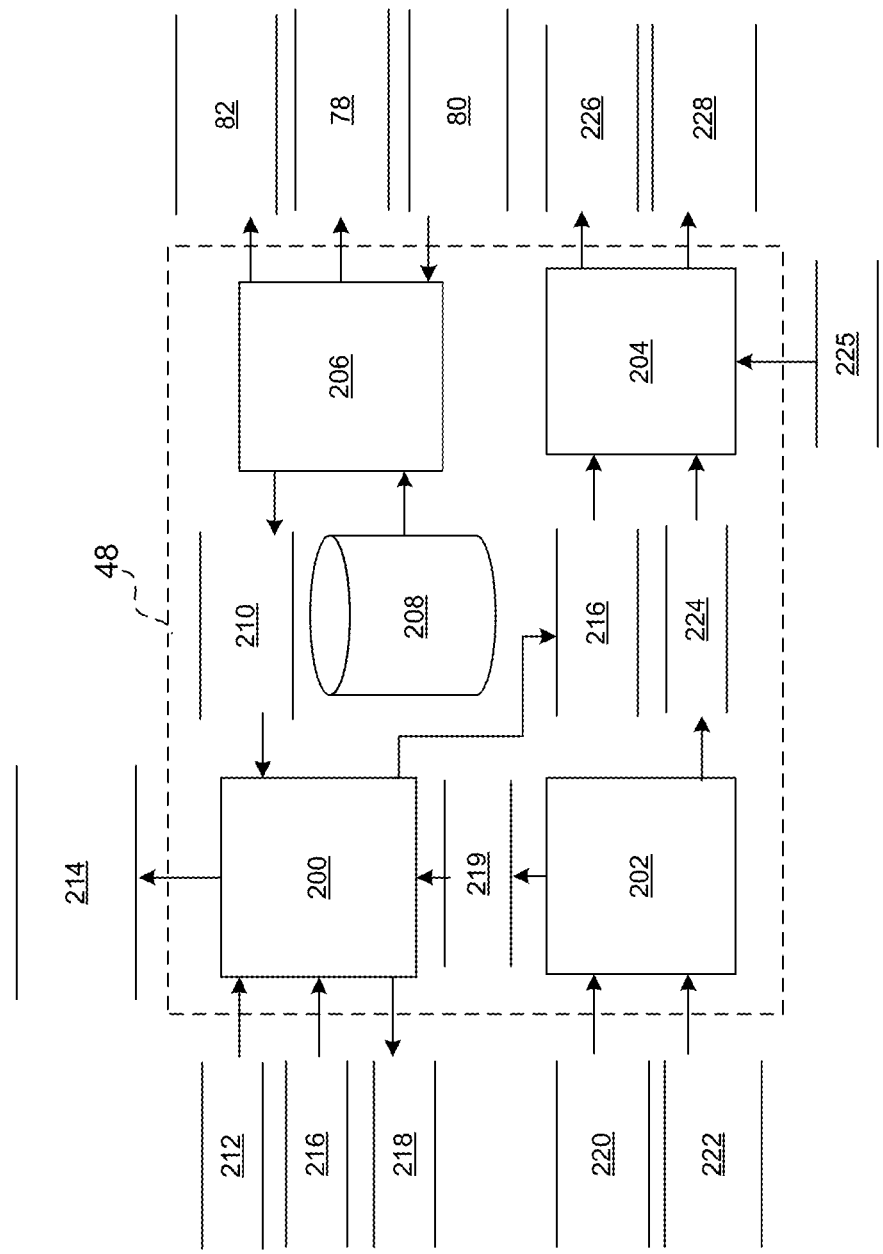
FIG. 6 is a dataflow diagram illustrating an exemplary connectivity application in accordance with an exemplary embodiment.

Referring now to FIG. 6, a dataflow diagram illustrates various embodiments of an exemplary connectivity application 48 of a remote device 22a-22n. In the example provided in FIG. 6, the connectivity application 48 is an ecostart application that communicates with the vehicle 12 (FIG. 1) to selectively start and stop the vehicle 12. The ecostart application selectively starts and stops the vehicle 12 (FIG. 1) based on a user request, and further based on temperature data received from the vehicle 12 (FIG. 1). The vehicle data is used to selectively start and stop the engine of the vehicle 12 (FIG. 1) to conserve energy. As can be appreciated, the connectivity applications 48 of the present disclosure can include various types of applications that operate based on communications with the vehicle 12 (FIG. 1) and are not limited to the present example. For example, the connectivity applications 48 can include, but are not limited to, a fuel level status application, a battery charge status application, an unlock doors application, etc.

In various embodiments, the connectivity application of FIG. 6 includes a user I/O manager 200, a temperature evaluator module 202, a start/stop manager module 204, and a device application download manager module 206. As can be appreciated, various embodiments of ecostart applications according to the present disclosure may include any number of sub-modules. For example, the sub-modules shown in FIG. 6 may be combined and/or further partitioned to similarly start the vehicle 12 (FIG. 1).

In various embodiments, the device application download manager module 206 manages the transmitting of the device application 82 from the remote device 22a (FIG. 1) to the connectivity device 20 (FIG. 1). For example, the device application download manager 206 generates the new application request 78 to the connectivity device 20 (FIG. 1). Once a download request 80 is received, the device application download manager module 206 transmits the device application 82 to the connectivity device 20 (FIG. 1). The device application download manager module 206 updates a connectivity status 210 based on whether the device application 82 has been successfully downloaded to the connectivity device 20 (FIG. 1).

The user I/O manager 200 manages input requests initiated by the user when interacting with the application interface 50 (FIG. 1). For example, when the user initiates a start vehicle request 212, the user I/O manager 200 receives the start vehicle request 212 and generates a temperature request 214 to the device application 82 on the connectivity device 20. In another example, when the user initiates a vehicle stop request 216, the user I/O manager 200 passes the vehicle stop request 216 to the start/stop manager module 204.

Figure 7:
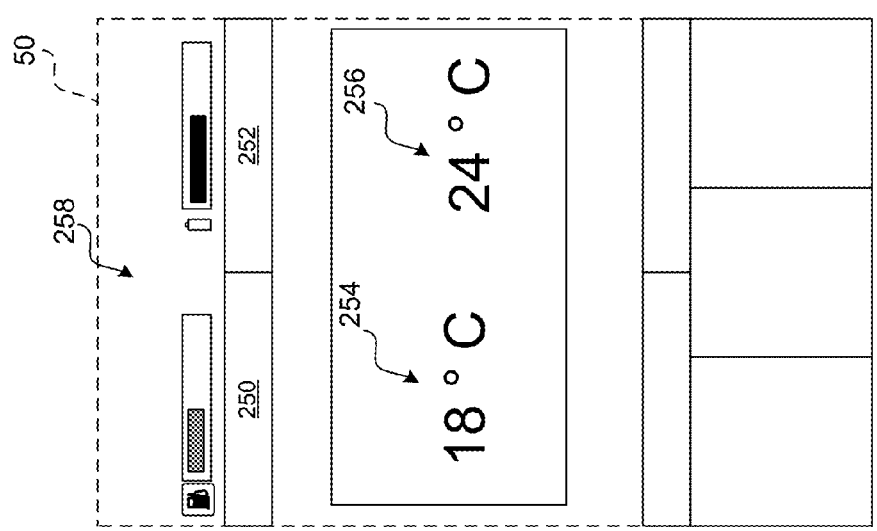
FIG. 7 is an illustration of an exemplary connectivity interface in accordance with an exemplary embodiment.

The user I/O manager further manages the application interface 50 (FIG. 1) via the interface data 218. For example, as shown in FIG. 7, various input selection items and information output items can be displayed by the application interface 50. The input selection items can include, but are not limited to, a start selection item 250, and a stop selection item 252. The information output items can include, but are not limited to, an inside temperature display 254, an outside temperature display 256, and a status display 258. The status display 258 can display any status of the vehicle 12 (FIG. 1) (e.g., a fuel level or battery charge level) or a status of the connection with the vehicle 12 (FIG. 1).

With reference back to FIG. 6, the temperature evaluator module 202 receives the temperature data from the device application 82 on the connectivity device 20. In one example, the temperature data includes outside air temperature 220 and inside cabin temperature 222. The temperature evaluator module 202 evaluates the temperatures 220, 222 and selectively determines a start stage 224 based thereon. In various embodiments, the start stage 224 can indicate the type or duration of a vehicle start. For example the start stage 224 can indicate a vehicle start with air conditioning start, a vehicle start with heater start, a vehicle start with heated seats start, a three minute start, a four minute start, a five minute start, a six minute start, etc. An exemplary start stage determination method is shown in FIGS. 8 and 9.

The start/stop manager module 204 evaluates the start stage 224 and generates vehicle start and vehicle stop requests 226, 228 based thereon. For example, when the start stage is a four minute start, the start/stop manager module 204 generates a vehicle start request 226 and after approximately four minutes of time has passed generates a vehicle stop request 228. The start/stop manager module 204 can further generate a vehicle stop request 228 at any time or when the vehicle 12 (FIG. 1) is operating based on the user initiated vehicle stop request 228.

Figure 8:
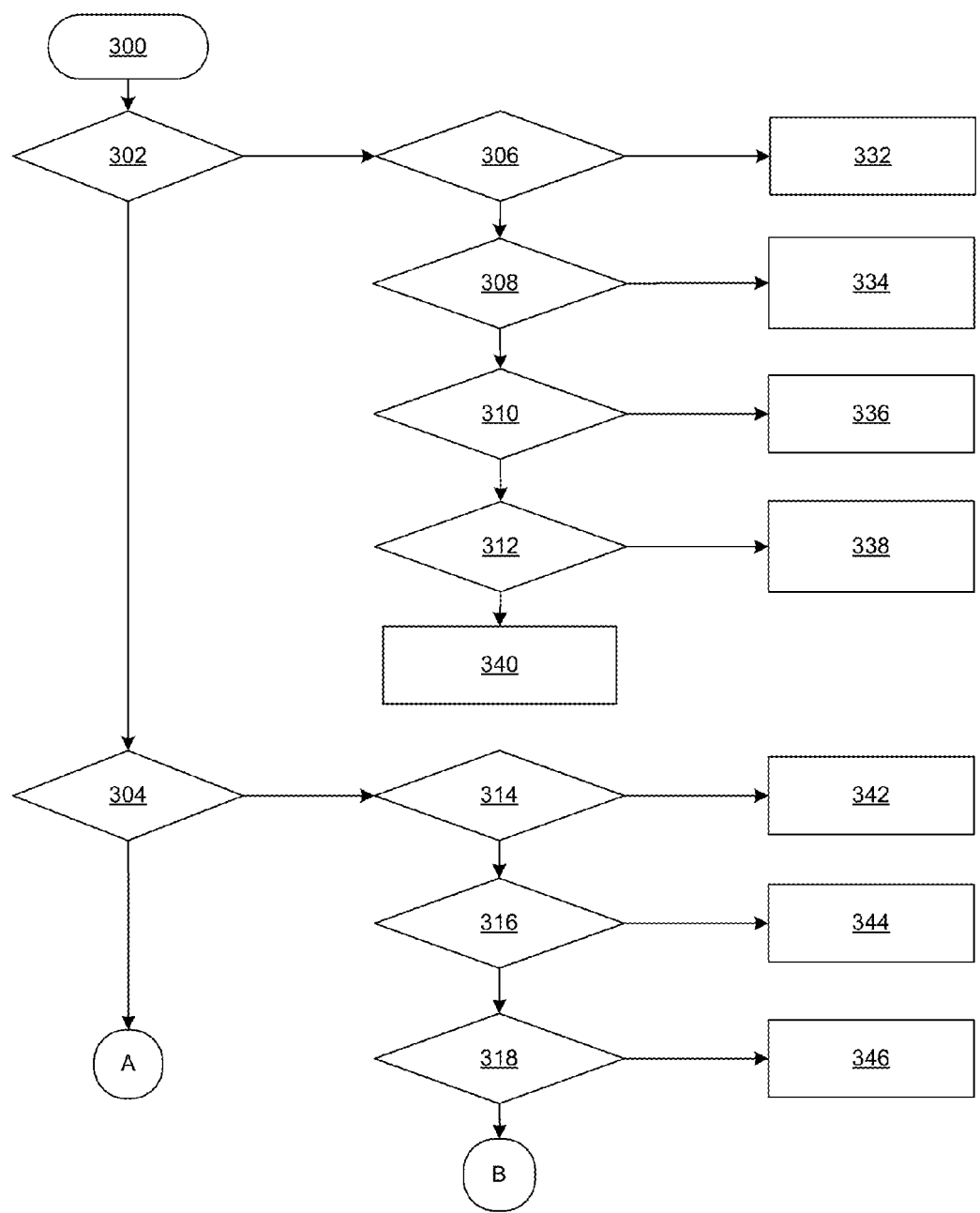
FIGS. 8 and 9 are flowcharts illustrating an exemplary connectivity method that can be performed by a connectivity application in accordance with an exemplary embodiment.
Figure 9:
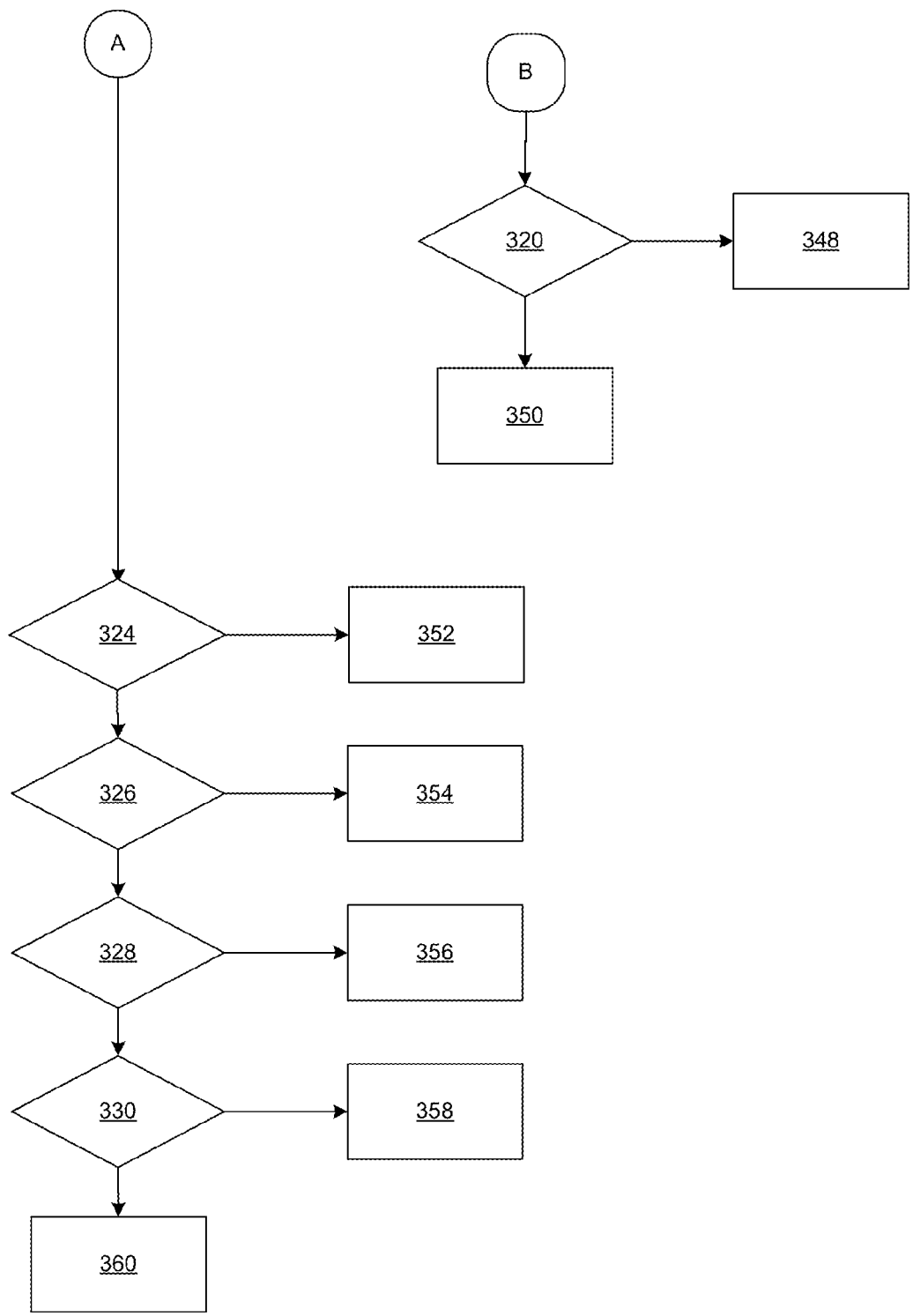

With reference now to FIGS. 8 and 9, flowcharts illustrate an ecostart method that can be performed by a connectivity application in accordance with exemplary embodiments. As can be appreciated in light of the disclosure, the order of operation within the method is not limited to the sequential execution as illustrated in FIGS. 8 and 9, but may be performed in one or more varying orders as applicable and in accordance with the present disclosure.

In one example, the method may begin at 300. The outside air temperature and the inside cabin temperature are evaluated at 302-330. Based on the outside air temperature and/or the inside cabin temperature, the messages are sent to start and stop the vehicle. For example, at 302, if the outside air temperature is greater than X degrees (e.g., eight degrees Celsius), then the inside cabin temperature is evaluated at 306-312. If the inside cabin temperature is greater than Y degrees (e.g., fifteen degrees Celsius) at 306, an air conditioning start method is performed at 332. For example, a start message is generated and an air conditioning request is generated. After Z time (e.g., five minutes) has passed, the vehicle stop message is generated.

If, however, the inside cabin temperature is not greater than Y degrees at 306, rather it is greater than or equal to T degrees (e.g., ten degrees Celsius) at 308, the vehicle start message is generated and after U time (e.g., three minutes) has passed, the vehicle stop message is generated at 334. If, however, the inside cabin temperature is not greater than or equal to T degrees at 308, rather it is greater than or equal to V degrees (e.g., five degrees Celsius) at 310, the vehicle start message is generated and after W time (e.g., four minutes) has passed, the vehicle stop message is generated at 336.

If, however, the inside cabin temperature is not greater than or equal to V degrees at 310, rather it is greater than or equal to A degrees (e.g., zero degrees Celsius) at 312, the vehicle start message is generated and after B time (e.g., five minutes) has passed, the vehicle stop message is generated at 338. If, however, the inside cabin temperature is not greater than or equal to A degrees at 312, the vehicle start message is generated and after C time (e.g., seven minutes) has passed, the vehicle stop message is generated at 340.

At 302, if the outside air temperature is less than or equal to X degrees, and the outside air temperature is greater than or equal to D degrees (e.g., zero degrees Celsius) at 304, the inside cabin temperature is evaluated at 314-320. For example, if the inside cabin temperature is greater than E degrees (e.g., fifteen degrees Celsius) at 314, a start message is generated and after F time (e.g., two minutes) has passed, the vehicle stop message is generated at 342.

If, however, the inside cabin temperature is not greater than E degrees at 314, rather it is greater than or equal to G degrees (e.g., ten degrees Celsius) at 316, the vehicle start message is generated and after H time (e.g., four minutes) has passed, the vehicle stop message is generated at 344. If, however, the inside cabin temperature is not greater than or equal to G degrees at 316, rather it is greater than or equal to I degrees (e.g., five degrees Celsius) at 318, the vehicle start message is generated and after J time (e.g., five minutes) has passed, the vehicle stop message is generated 346.

If, however, the inside cabin temperature is not greater than or equal to I degrees at 318, rather it is greater than or equal to K degrees (e.g., zero degrees Celsius) at 320, the vehicle start message is generated and after L time (e.g., six minutes) has passed, the vehicle stop message is generated at 348. If, however, the inside cabin temperature is not greater than or equal to K degrees at 320, the vehicle start message is generated and after M time (e.g., eight minutes) has passed, the vehicle stop message is generated at 350.

At 304, if the outside air temperature is less than D degrees, the inside air temperature is evaluated at 324-330. For example, if the inside cabin temperature is greater than N degrees (e.g., fifteen degrees Celsius) at 324, a start message is generated and after O time (e.g., six minutes) has passed, the vehicle stop message is generated at 352. If, however, the inside cabin temperature is not greater than N degrees at 324, rather it is greater than or equal to P degrees (e.g., ten degrees Celsius) at 326, the vehicle start message is generated and after Q time (e.g., seven minutes) has passed, the vehicle stop message is generated at 354. If however, the inside cabin temperature is not greater than or equal to P degrees at 326, rather it is greater than or equal to R degrees (e.g., five degrees Celsius) at 328, the vehicle start message is generated and after S time (e.g., eight minutes) has passed, the vehicle stop message is generated at 356.

If, however, the inside cabin temperature is not greater than or equal to R degrees at 328, rather it is greater than or equal to T' degrees (e.g., zero degrees Celsius) at 330, the vehicle start message is generated and after U' time (e.g., nine minutes) has passed, the vehicle stop message is generated at 358. If, however, the inside cabin temperature is not greater than or equal to T' degrees at 330, the vehicle start message is generated and after V' time (e.g., ten minutes) has passed, the vehicle stop message is generated at 360.

In various embodiments, the ecostart connectivity application 48 can be implemented in computer program product. The computer program product includes a tangible storage medium that is readable by a processing circuit and that stores instructions for execution by the processing circuit. The instructions carryout the methods of the ecostart connectivity application 48.

In various embodiments, the methods of the ecostart connectivity application 48 can further be implemented in systems other than as described above. For example, the methods can be implemented by onboard vehicle modules or other modules that communicate with the vehicle 12 (FIG. 1).

While the invention has been described with reference to various exemplary embodiments, it will be understood by those skilled in the art that changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A method of starting a vehicle using a remote device, comprising:
   transmitting, by the remote device, a device application to a computer processor-enabled connectivity device that is communicatively coupled to the vehicle, the device application configured to acquire vehicle data from the vehicle and transmit the vehicle data to the remote device upon request from the remote device;
   acquiring, via the device application in the vehicle, the vehicle data from the vehicle;
   transmitting, via the device application in the vehicle, the vehicle data to the remote device upon request from the remote device;
   receiving, by user input to the remote device, a start request;
   transmitting a request for a first temperature associated with the vehicle to the device application, the first temperature identified as the vehicle data;
   receiving the first temperature from the computer processor-enabled connectivity device;
   evaluating the first temperature at the remote device;
   initiating starting of the vehicle by generating a signal to the vehicle based on the start request and the first temperature; and
   evaluating a second temperature at the remote device, and wherein the initiating the starting of the vehicle includes:
      evaluating the first temperature in view of the second temperature; and
      initiating a heating, air conditioning, and ventilation system function on the vehicle when the first temperature exceeds a first threshold value and the second temperature exceeds a second threshold value, the first threshold value is different than the second threshold value.

2. The method of claim 1, wherein the first temperature is outside air temperature.

3. The method of claim 1, wherein the first temperature is inside cabin temperature.

4. The method of claim 1, wherein the first temperature is outside air temperature and the second temperature is inside cabin temperature.

5. The method of claim 1, further comprising selecting a start duration based on the first temperature.

6. The method of claim 5, further comprising generating a stop request based on the start duration.

7. The method of claim 1, further comprising selecting a start duration based on the first temperature and the second temperature.

8. The method of claim 7, further comprising generating a stop request based on the start duration.

9. The method of claim 1, further comprising initiating at least one of an air conditioning start request and a heater start request based on the first temperature.

10. A system for starting a vehicle, comprising:
   a remote device including a computer processor; and
   a connectivity application executable by the computer processor, the connectivity application configured to implement a method, the method comprising:
   transmitting a device application to a computer processor-enabled connectivity device that is communicatively coupled to the vehicle, the device application configured to acquire vehicle data from the vehicle and transmit the vehicle data to the remote device upon request from the remote device;
   acquiring, via the device application in the vehicle, the vehicle data from the vehicle;
   transmitting, via the device application in the vehicle, the vehicle data to the remote device upon request from the remote device;
   receiving, by user input to the remote device, a start request;
   transmitting a request for a first temperature associated with the vehicle to the device application, the first temperature identified as the vehicle data;
   receiving the first temperature from the computer processor-enabled connectivity device;
   evaluating the first temperature at the remote device;

initiating starting of the vehicle by generating a signal to the vehicle based on the start request and the first temperature; and evaluating a second temperature at the remote device, wherein the initiating the starting of the vehicle includes:

evaluating the first temperature in view of the second temperature; and initiating a heating, air conditioning, and ventilation system function on the vehicle when the first temperature exceeds a first threshold value and the second temperature exceeds a second threshold value, the first threshold value is different than the second threshold value.

11. The system of claim 10, wherein the computer-processor enabled connectivity device is removably coupled to the vehicle.

12. The system of claim of claim 10, wherein the first temperature is outside air temperature.

13. The system of claim 10, wherein the first temperature is inside cabin temperature.

14. The system of claim 10, wherein the first temperature is outside air temperature and the second temperature is inside cabin temperature.

15. The system of claim 10, wherein the connectivity application is further configured to implement:

selecting a start duration based on the first temperature.

16. The system of claim 15, wherein the connectivity application is further configured to implement:

generating a stop request based on the start duration.

17. The system of claim 10, wherein the connectivity application is further configured to implement:

selecting a start duration based on the first temperature and the second temperature.

18. The system of claim 17, wherein the connectivity application is further configured to implement:

generating a stop request based on the start duration.

\* \* \* \* \*